(12) United States Patent
Domsch et al.

(10) Patent No.: US 10,760,711 B2
(45) Date of Patent: Sep. 1, 2020

(54) VALVE REPLACEMENT DEVICE

(71) Applicant: Broken Drum Enterprises, LLC, Brewster, KS (US)

(72) Inventors: Brandon Domsch, Brewster, KS (US); William Wilhite, Brewster, KS (US)

(*) Notice: Subject to any disclaimer, the term of this patent is extended or adjusted under 35 U.S.C. 154(b) by 0 days.

(21) Appl. No.: 15/218,702

(22) Filed: Jul. 25, 2016

(65) Prior Publication Data

US 2017/0030482 A1 Feb. 2, 2017

Related U.S. Application Data

(60) Provisional application No. 62/199,470, filed on Jul. 31, 2015.

(51) Int. Cl.
| | | |
|---|---|---|
| *F16K 43/00* | (2006.01) | |
| *F16K 7/10* | (2006.01) | |
| *F16L 55/18* | (2006.01) | |

(52) U.S. Cl.
CPC .............. *F16K 43/001* (2013.01); *F16K 7/10* (2013.01); *F16L 55/18* (2013.01)

(58) Field of Classification Search
CPC .......... F16K 7/10; F16K 43/00; F16K 43/001; F16L 55/134; Y10T 137/0475
USPC ......................... 137/15.15, 315.42, 317, 320
See application file for complete search history.

(56) References Cited

U.S. PATENT DOCUMENTS

| | | | | |
|---|---|---|---|---|
| 1,946,138 A | * | 2/1934 | Gardner | F16K 7/10 138/93 |
| 3,842,864 A | * | 10/1974 | Riegel | F16K 7/10 138/93 |
| 4,127,141 A | * | 11/1978 | Ledonne | F16L 55/124 137/15.15 |
| 4,398,565 A | * | 8/1983 | Williamson | F16L 55/134 138/93 |
| 4,427,031 A | * | 1/1984 | Di Giovanni | F16L 55/1657 138/97 |
| 4,505,295 A | * | 3/1985 | Quin | F16K 43/00 137/315.41 |
| 5,357,763 A | * | 10/1994 | Vogel | F16L 55/124 138/93 |
| 5,400,814 A | * | 3/1995 | Tigerholm | F16L 41/06 137/15.15 |
| 5,524,661 A | * | 6/1996 | Tigerholm | F16L 55/12 137/15.15 |
| 5,778,919 A | * | 7/1998 | Petrone | F16L 55/124 137/15.08 |
| 6,263,896 B1 | | 7/2001 | Williams | |
| 6,581,620 B2 | | 6/2003 | Babcock | |
| 6,820,636 B1 | | 11/2004 | Kien | |

(Continued)

*Primary Examiner* — Reinaldo Sanchez-Medina
(74) *Attorney, Agent, or Firm* — Thrasher Associates (57) ABSTRACT

A valve replacement device is disclosed. An example valve replacement device includes a body configured to thread onto a valve, and an insertion tube movable through the body. A seal is provided between the insertion tube and the body. The seal enables the insertion tube to be moved through the body while at least partially retaining a fluid within a portion of the body. A balloon is provided on the insertion tube. The balloon is configured to be inflated and deflated through the insertion tube. The balloon is inflated to retain a fluid within the tank while the existing valve is removed from the tank and replaced. The balloon is deflated and removed after replacement of the existing valve.

1 Claim, 14 Drawing Sheets

(56) References Cited

U.S. PATENT DOCUMENTS

| | | |
|---|---|---|
| 7,520,301 B2 | 4/2009 | Ord |
| 8,281,818 B1 | 10/2012 | Vazquez |
| 8,800,602 B2 | 8/2014 | Al Shammary |
| 9,857,016 B2 * | 1/2018 | Bourne .................. F16L 55/18 |
| 2001/0047825 A1 * | 12/2001 | Williams ................. F16K 7/10 |
| | | 137/315.06 |

* cited by examiner

VALVE REPLACEMENT DEVICE

PRIORITY CLAIM

This application claims the priority of U.S. Provisional Patent Application No. 62/199,470 filed Jul. 31, 2015 titled "Valve Replacement Device" of Brandon Domsch and William Wilhite, hereby incorporated by reference herein in its entirety as though fully set forth herein.

BACKGROUND

Large tanks (e.g., oil, water, or other fluid) often have a valve to release fluid from the tank when desired. These valves may fail (e.g., begin to leak) and need to be replaced. Before replacing the valve, the entire tank has to be drained to avoid spilling or otherwise losing fluid during removal and replacement of the valve. This can be time consuming and expensive, for example, if a tanker truck has to be brought in to temporarily store the fluid drained from the tank.

DETAILED DESCRIPTION

A valve replacement device and methods of operation are disclosed. In an example, the valve replacement device can be fitted through a valve that is to be replaced to stop flow of the fluid from the tank or other container. The existing valve may then be removed and replaced with another valve or repaired and returned to service). The valve replacement device can then be removed to resume normal operation of the valve and tank.

An example valve replacement device includes a body configured to thread onto a valve, and an insertion tube movable through the body. A seal is provided between the insertion tube and the body. The seal enables the insertion tube to be moved through the body while at least partially retaining a fluid within a portion of the body. A balloon is provided on the insertion tube. The balloon is configured to be inflated and deflated through the insertion tube. The balloon is inflated to retain a fluid within the tank while the existing valve is removed from the tank and replaced. The balloon is deflated and removed after replacement of the existing valve.

An example method of valve replacement includes fastening a replacement body to a valve and opening a gate of the valve while the replacement body retains a fluid. An insertion tube is extended through the replacement body and through the valve to a position behind the gate of the valve. A balloon on the insertion tube is inflated in the position behind the gate of the valve. The balloon reduces or altogether prevents fluid from leaking out of a tank during valve removal. The replacement body can be removed and the valve can be removed.

The valve can then be replaced. For example, the valve may be replaced with the same valve (e.g., a repaired or cleaned valve). Or the valve may be replaced with a different valve.

Following replacement of the valve, the balloon may be deflated (e.g., via an air release on the insertion tube). The insertion tube and the balloon can be withdrawn from behind the gate of the valve so that the gate can be closed. The replacement body can then be removed from the valve.

Before continuing, it is noted that as used herein, the terms "includes" and "including" mean, but is not limited to, "includes" or "including" and "includes at least" or "including at least." The term "based on" means "based on" and "based at least in part on."

Figure 1:
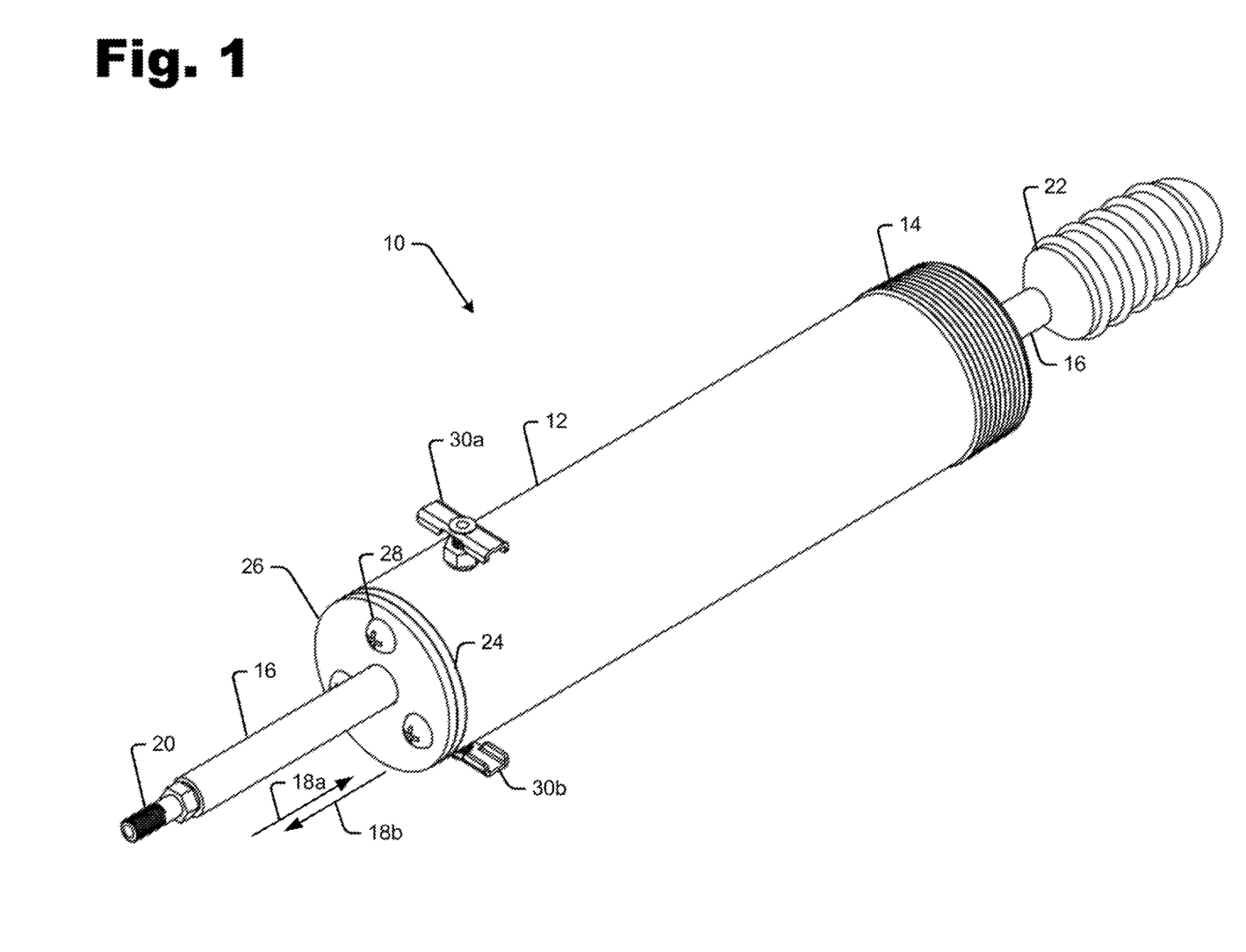
FIG. 1 is a front perspective view of an example valve replacement device.
Figure 2:
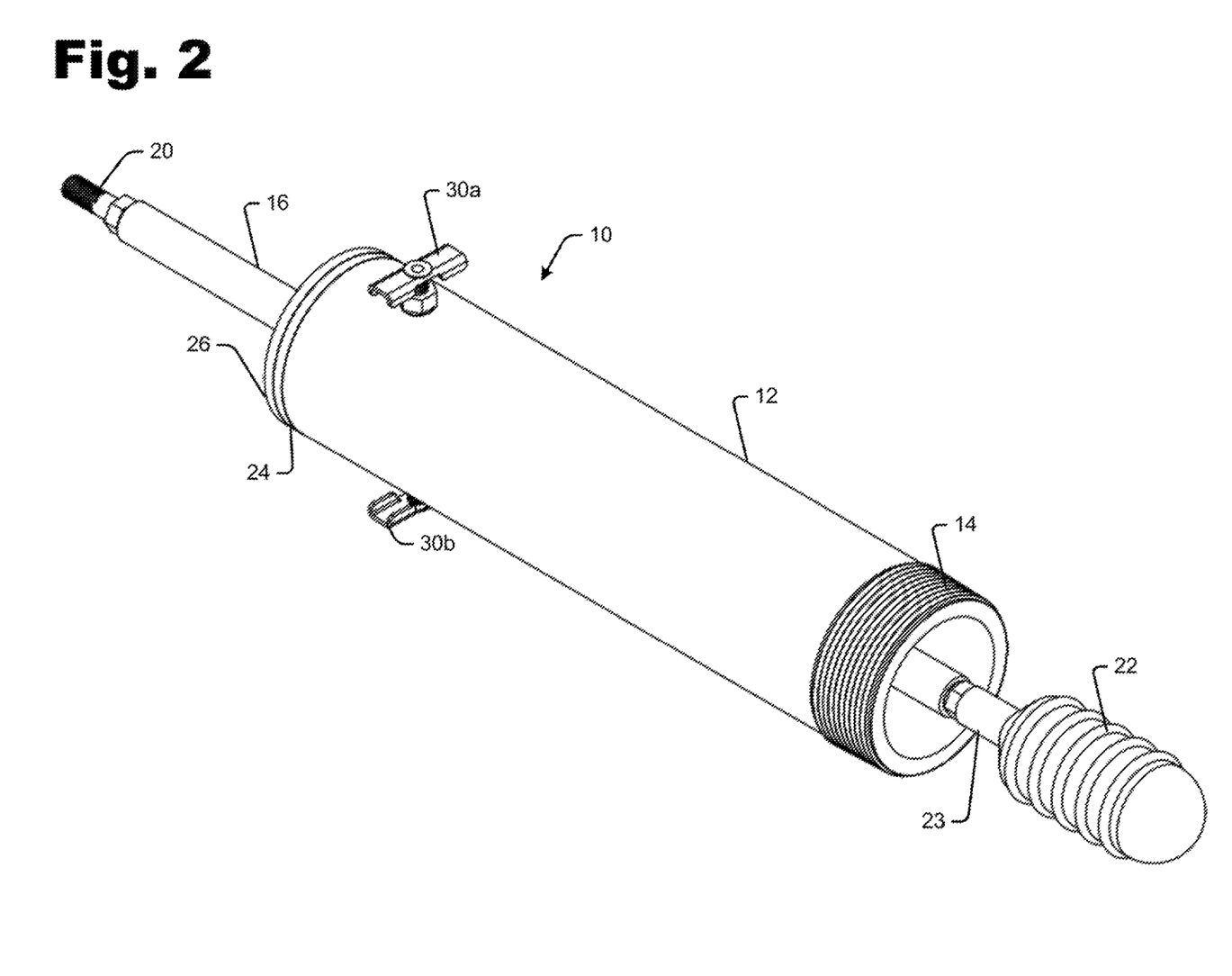
FIG. 2 is a rear perspective view of the example valve replacement device.
Figure 3:
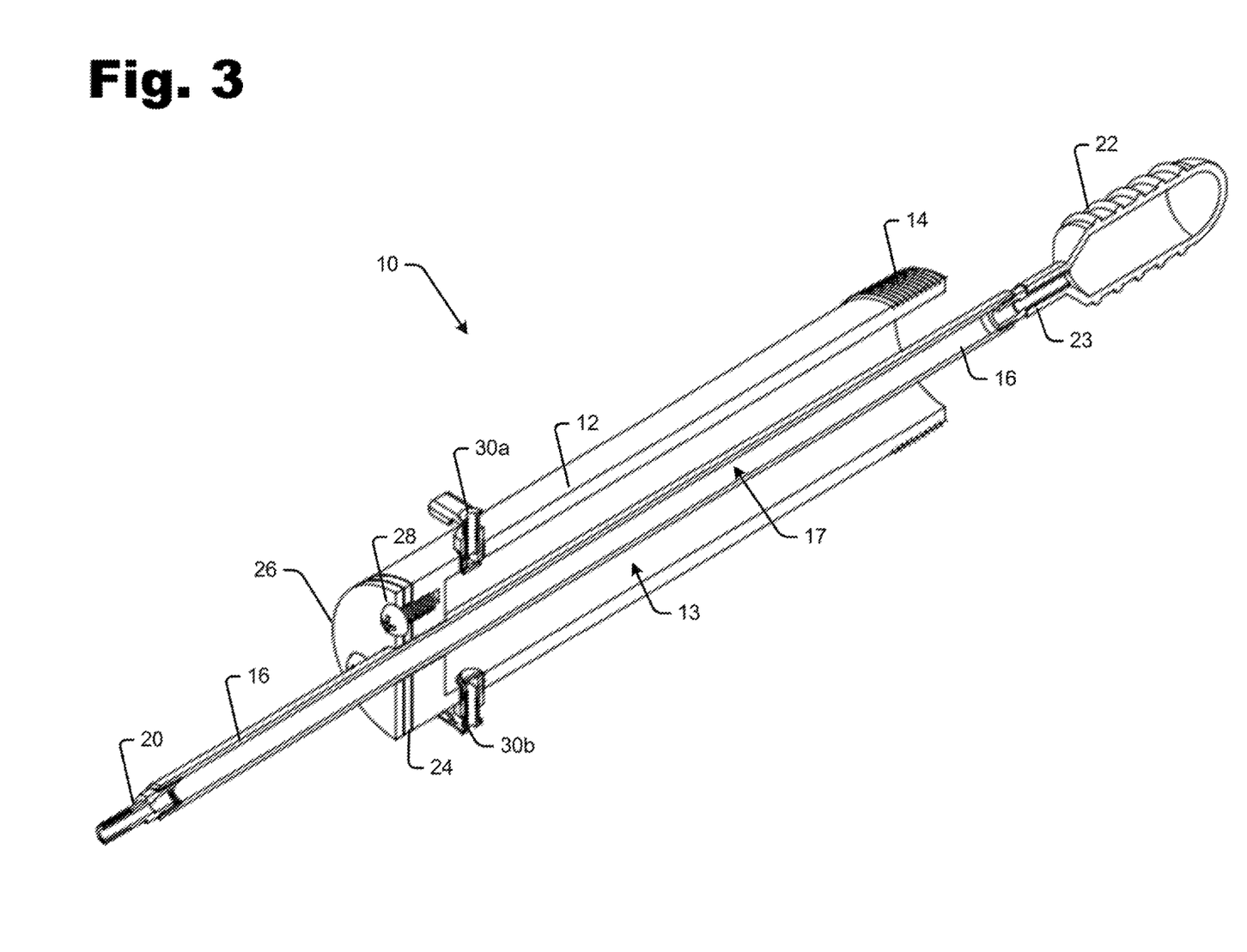
FIG. 3 is a partial cutaway view of the example valve replacement device corresponding to FIG. 1.
Figure 4:
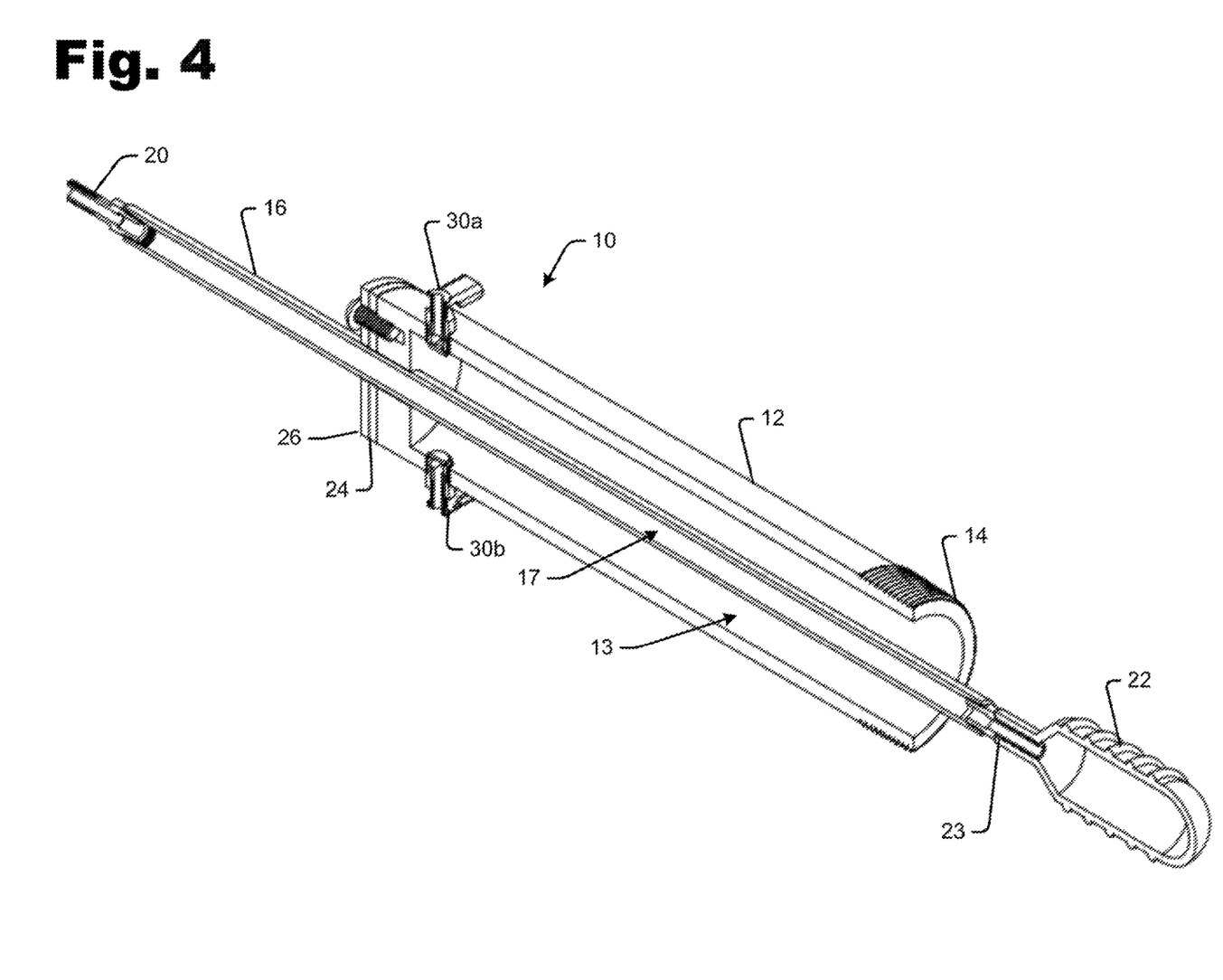
FIG. 4 is a partial cutaway view of the example valve replacement device corresponding to FIG. 2.

FIG. 1 is a front perspective view of an example valve replacement device 10. FIG. 2 is a rear perspective view of the example valve replacement device 10 shown in FIG. 1. FIG. 3 is a partial cutaway view of the example valve replacement device 10 corresponding to FIG. 1. FIG. 4 is a partial cutaway view of the example valve replacement device 10 corresponding to FIG. 2.

In an example, the valve replacement device 10 includes a replacement body 12 having a hollow core 13 or cavity formed therein (see, e.g., FIGS. 3 and 4). The replacement body 12 is shown having a substantially cylindrical shape, although other shapes are contemplated. The replacement body 12 is configured to fit onto a valve, such as a valve installed on a tank. The tank may contain fluid such as oil, water, milk, or any other fluid, or even a gas. Of course, the valve replacement device 10 may be utilized for any valve replacement and is not limited to valves on tanks. The replacement body 12 may include threads 14 to screw onto and off of the valve. However, other fitments (e.g., press-fit) may also be implemented.

The example valve replacement device 10 also includes an insertion tube 16. The insertion tube 16 is fitted through the body 12 of the valve replacement device 10, and can be moved, e.g., in the directions of arrows 18a and 18b. On one end, the insertion tube 16 includes a valve stem 20 with a valve. In an example, the valve is a Shrader valve, although any suitable valve may be implemented. The valve stem 20 enables air to be pumped through the insertion tube 16 and into a balloon 22 on the opposite end, to inflate the balloon 22. The valve stem also enables air to be released from the balloon 22 to deflate the balloon 22.

On the other end, the insertion tube 16 includes a balloon 22 that can be expanded and restricted in size (e.g., along the circular cross-sectional diameter). The balloon is configured to be inflated and deflated through the insertion tube. For example, the balloon 22 may be inflated by attaching an air pump or air compressor to the valve stem 20. Likewise, the balloon 22 may be deflated by releasing the Shrader valve or otherwise opening the valve. Of course, the balloon 22 can be inflated with any substantial (gas or liquid) and is not limited to inflation by air.

During operation, the balloon 22 is inflated to provide a blockage which retains a fluid (or gas) within the tank while the existing valve is removed from the tank and replaced. The balloon is then deflated and removed after replacement of the valve.

The example valve replacement device 10 may also include a seal 24 between the insertion tube 16 and the body 12. The seal 24 enables the insertion tube 16 to be moved through the body 12 while retaining a fluid at least partially within the body 12. The seal may be fastened to the body by a seal flange 26 and fasteners 28.

The example valve replacement device 10 may also include at least one (two are shown) release valve(s) 30a-b on the body 12. In an example, the valve(s) 30-a-b are petcock valves. The release valve(s) may be opened to relieve pressure build-up in the body 12, e.g., by draining some or all of the fluid collected therein before removing the body 12 from the valve during a valve replacement.

It is noted that the valve replacement device 10 may be manufactured to any desired specifications, including size, shape, dimensions and material(s), as will be readily understood by those having ordinary skill in the art after becoming familiar with the teachings herein.

Figure 5:
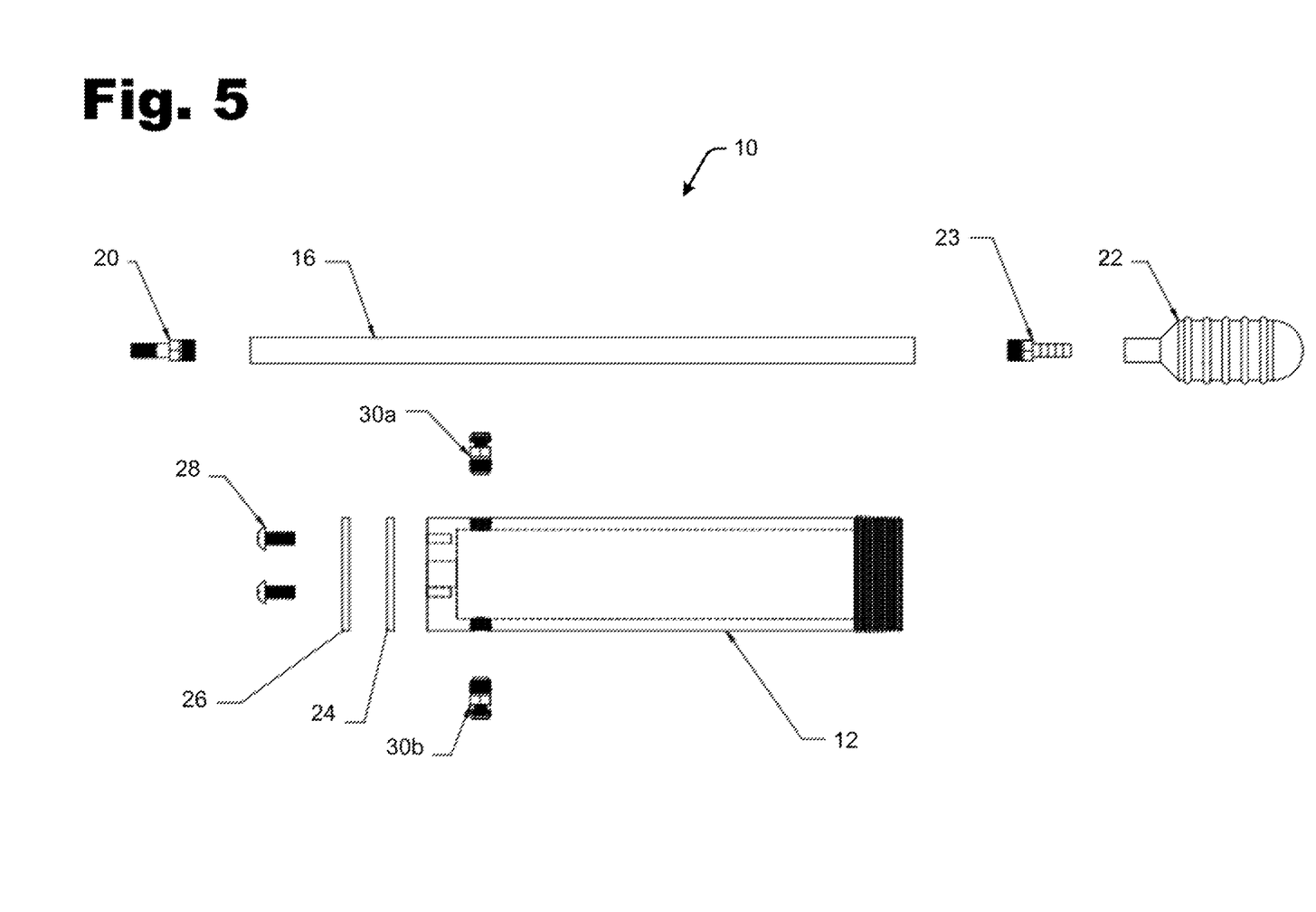
FIG. 5 is an exploded parts side view of the example valve replacement device.

FIG. 5 is an exploded parts side view of the example valve replacement device 10. In an example, the valve replacement device 10 includes a body 12 configured to thread onto a valve, and an insertion tube 16 that is movable through the body 12. A seal 24 is provided between the insertion tube 16 and the body 12. The seal 24 enables the insertion tube 16 to be moved (e.g., slid back and forth) through the body 12 while at least partially retaining a fluid within a portion of the body 12.

The valve replacement device 10 also includes a balloon 22 on the insertion tube 16. The balloon 22 may be connected to the insertion tube by a fitting 23. In an example, the fitting 23 is a barbed hose fitting. However, the balloon 22 may be connected to the insertion rod 16 in any suitable manner. The balloon 22 is configured to be inflated and deflated through the insertion tube 16. The balloon 22 is inflated to retain a fluid within the tank while the existing valve is removed from the tank and replaced. The balloon 22 is deflated and removed after replacement of the existing valve.

The example valve replacement device 10 also includes a valve stem 20 on an end of the insertion tube 16. The valve stem 22 includes a valve that opens to permit air flow through the insertion tube and into the balloon to inflate the balloon. The valve in valve stem 20 closes to retain air within the balloon 22 and maintain the balloon 22 in an enlarged configuration. The valve in valve stem 20 may be opened to release air from the balloon 22 to deflate the balloon 22.

The example valve replacement device 10 may also include at least one valve 30a-b (e.g., petcock valves) on the body 12.

Figure 6:
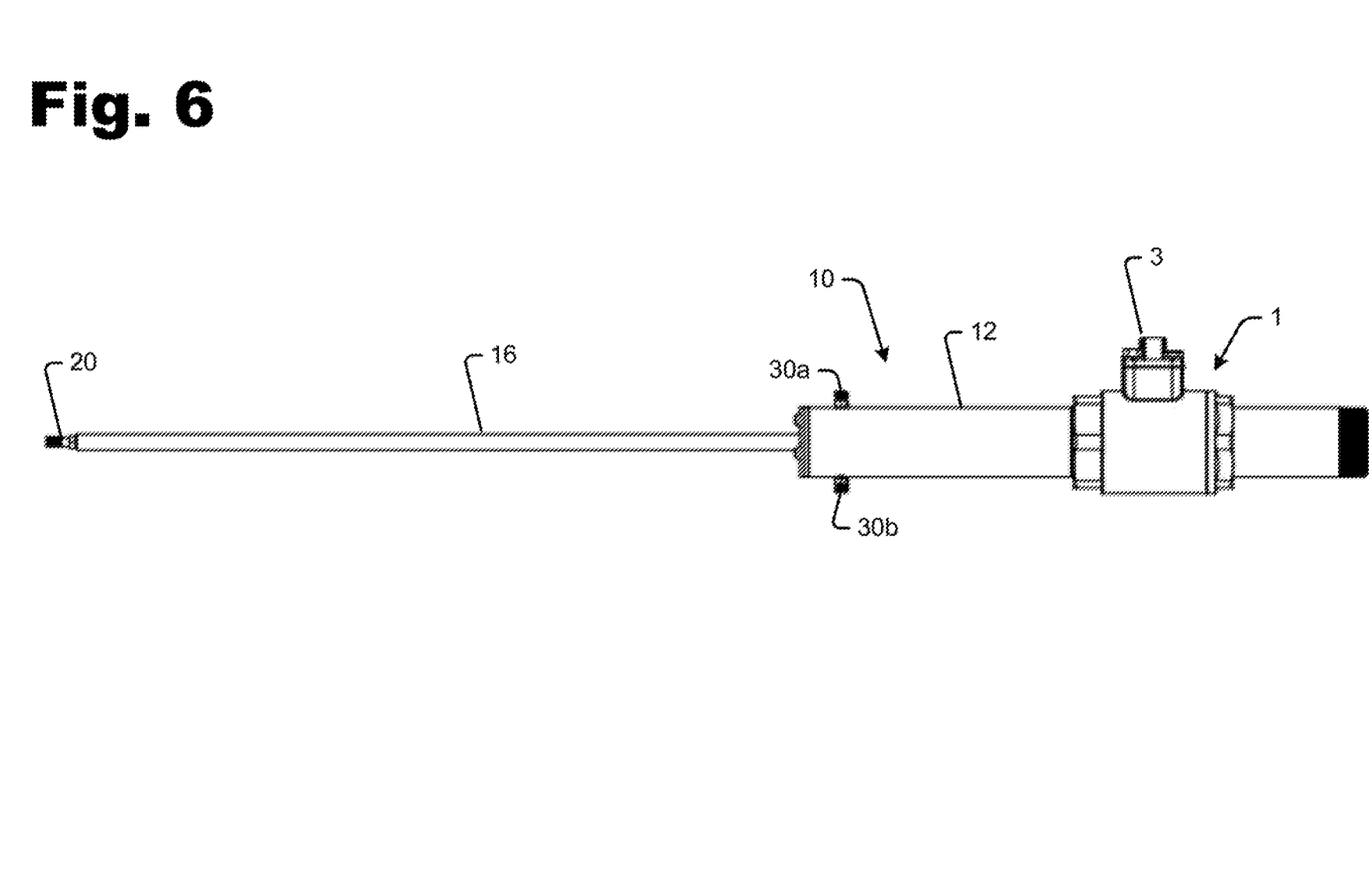
FIG. 6 is an assembled side view of the example valve replacement device.
Figure 7:
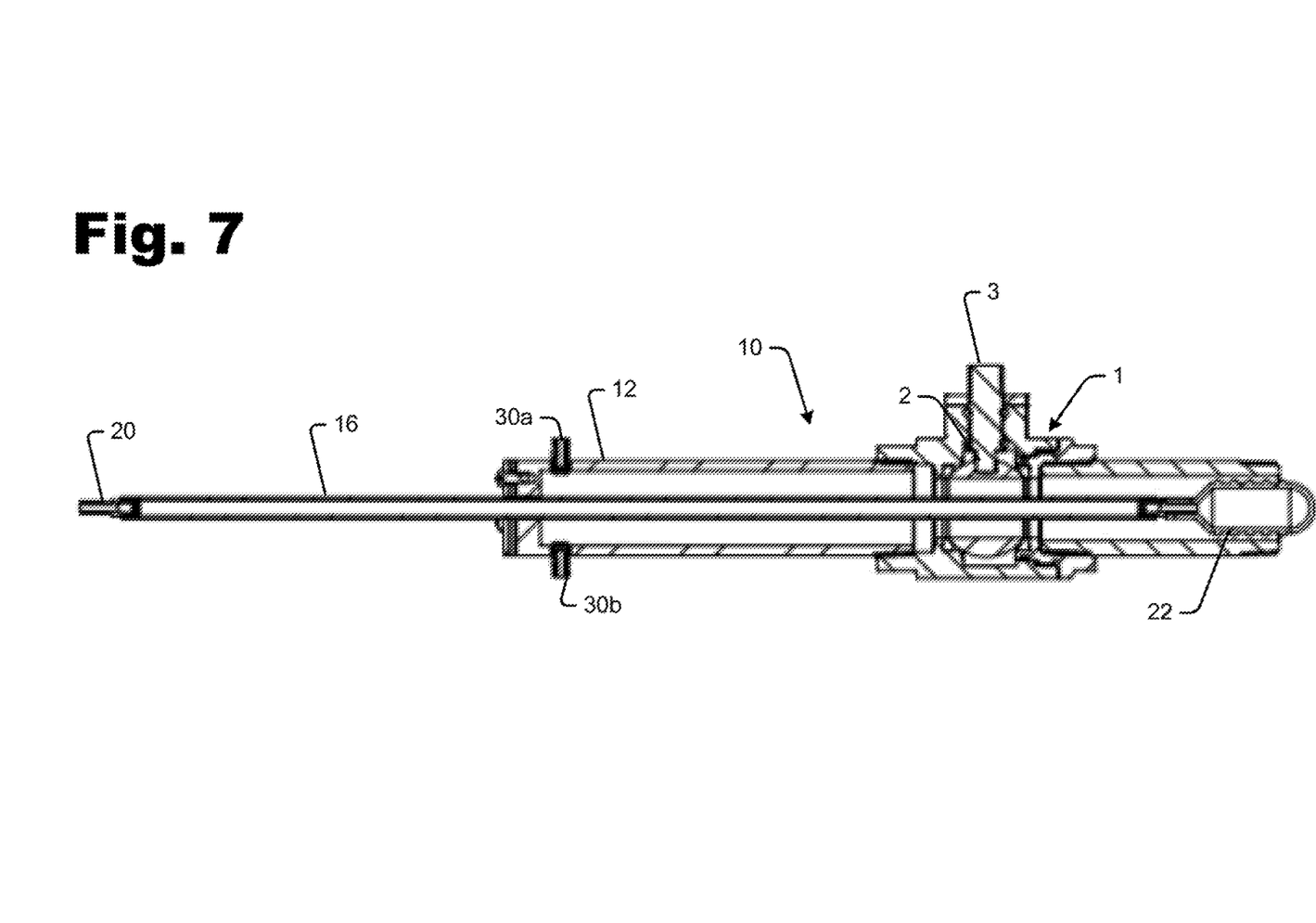
FIG. 7 is a partial cutaway side view of the example valve replacement device corresponding to FIG. 6.

FIG. 6 is an assembled side view of the example valve replacement device 10. FIG. 7 is a partial cutaway side view of the example valve replacement device 10 corresponding to FIG. 6. In both FIGS. 6 and 7, the valve replacement device 10 is assembled onto a valve 1. In an example, the valve replacement device 10 may be threaded onto mating threads on the valve 1. Once the valve replacement device 10 has been seated on the valve, the valve gate 2 (FIG. 7) can be opened and the insertion rod 16 inserted through the valve gate 2. It is noted that during this time when the valve gate 2 is opened, some fluid may flow into the sealed chamber 13 of the body 12 of the valve replacement device 10. The balloon 22 is then expanded at some point behind the valve gate 2, as shown in FIG. 7, to block fluid flow out of the tank (not shown in FIG. 6 or 7). The petcock valve(s) 30a-b can be opened to drain some of all of the fluid from the chamber 13, e.g., into a collection basin. The body 12 can then be removed from the valve, and the valve replaced, as further illustrated by FIGS. 8A-N described below.

Before continuing, it should be noted that the examples described above are provided for purposes of illustration, and are not intended to be limiting. Other devices and/or device configurations may be utilized to carry out the operations described herein.

Figure 8A:
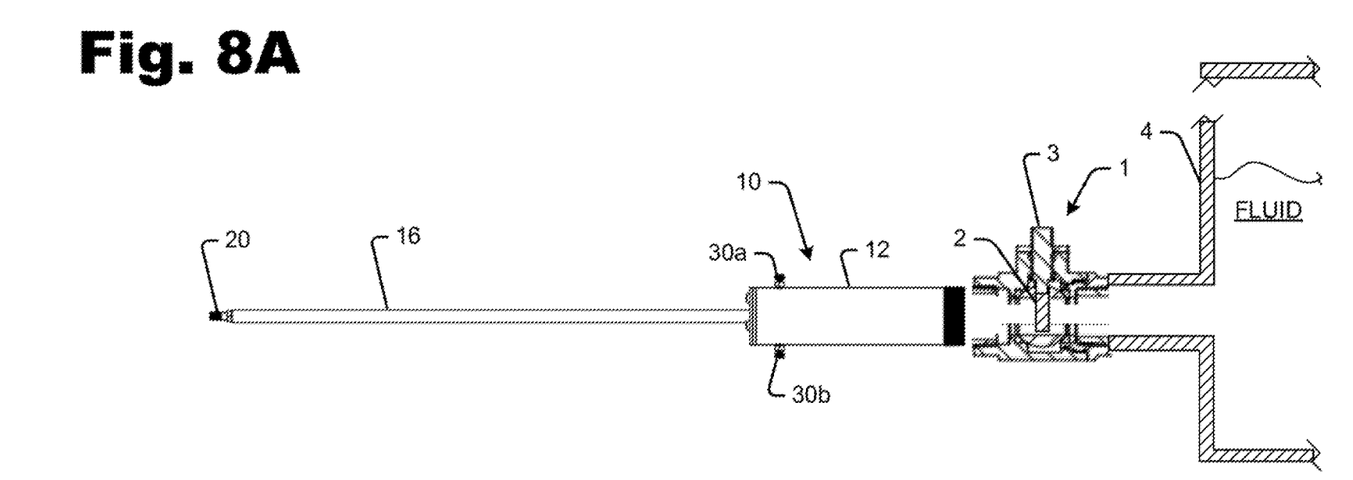
FIGS. 8A-N illustrate example operation of the valve replacement device.
Figure 8B:
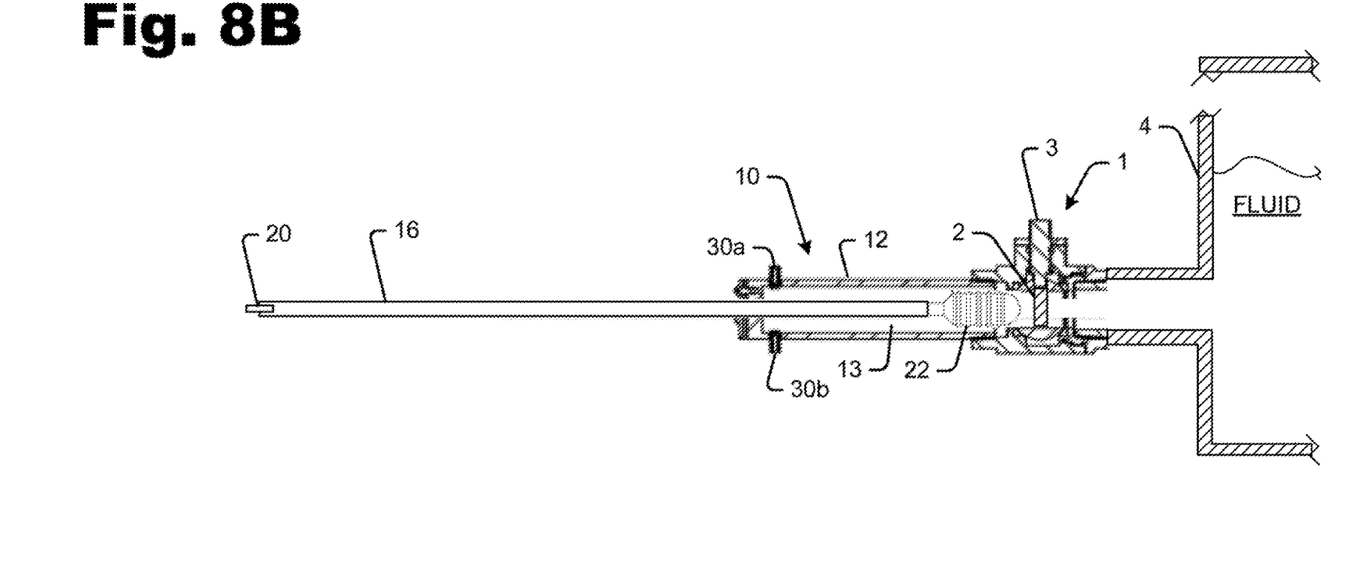
Figure 8C:
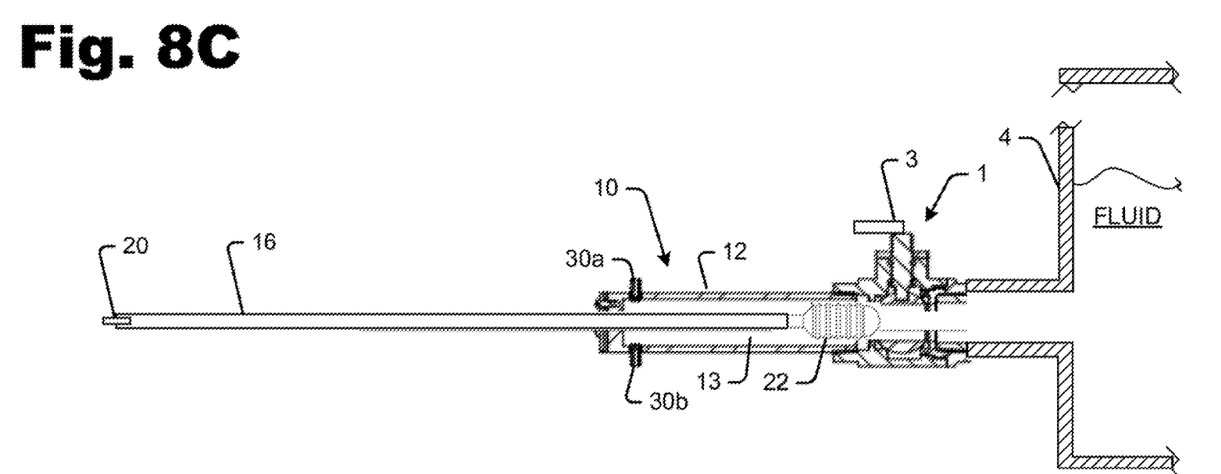

FIGS. 8A-N illustrate example operation of the valve replacement device. In FIGS. 8A and 8B, the replacement body 12 is attached to a valve 1 (e.g., on tank 4 containing a fluid). In FIG. 8C, a gate 2 of the valve 1 is opened (e.g., by operating handle 3 on the valve 1). During this time, fluid from the tank 4 may flow into replacement body 12, but is retained within the cavity 13 of the replacement body 12.

Figure 8D:
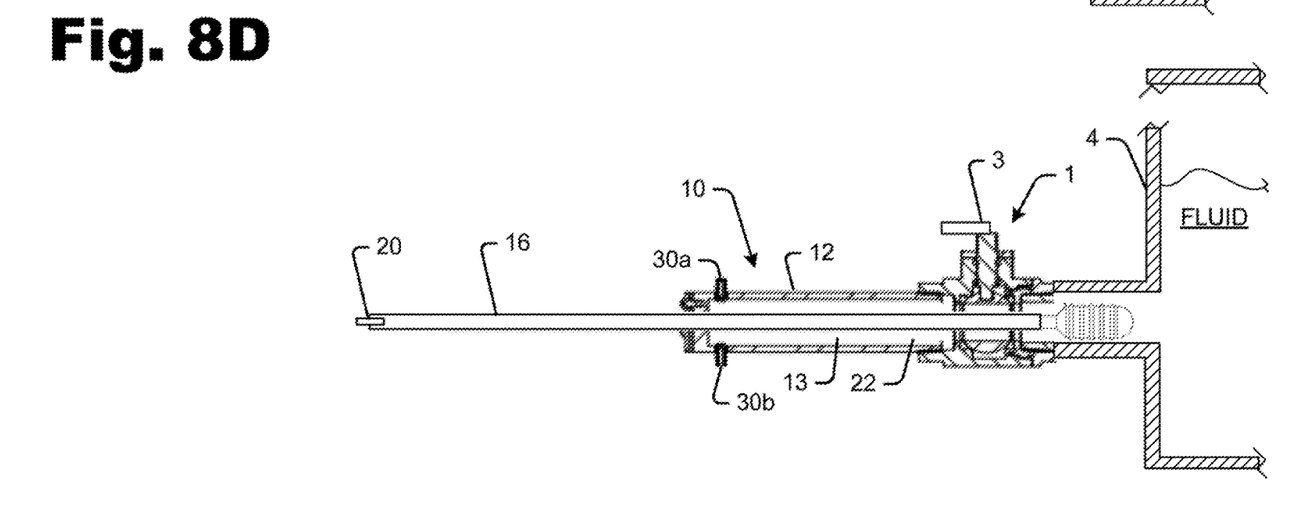
Figure 8E:
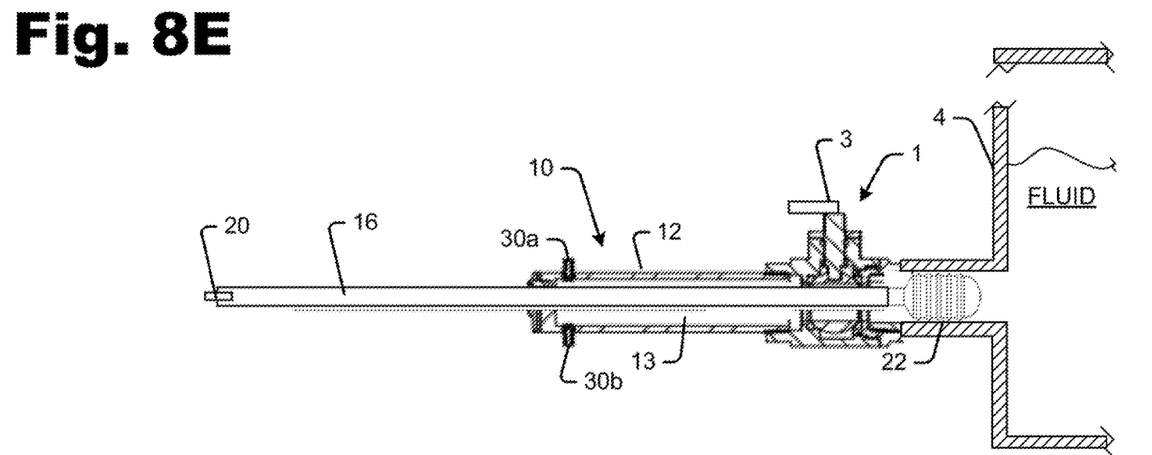

In FIG. 8D, the insertion tube 16 is extended (e.g., by pushing) through the replacement body 12 and through the valve 1 to a position behind the gate 2 of the valve 1. In FIG. 8E, the balloon 22 is inflated in the position behind the gate 2 of the valve 1.

Figure 8F:
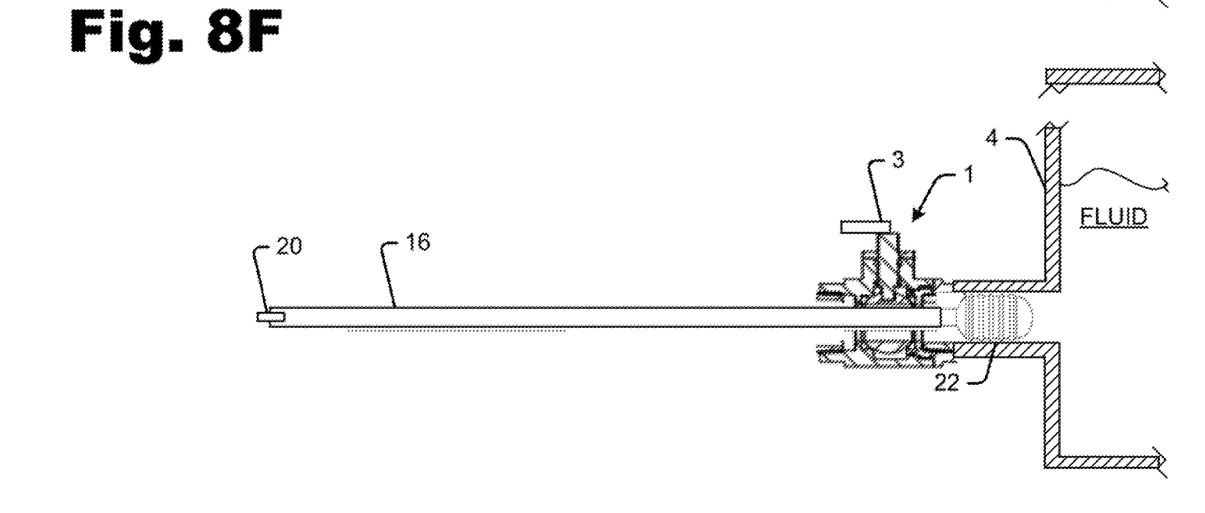
Figure 8G:
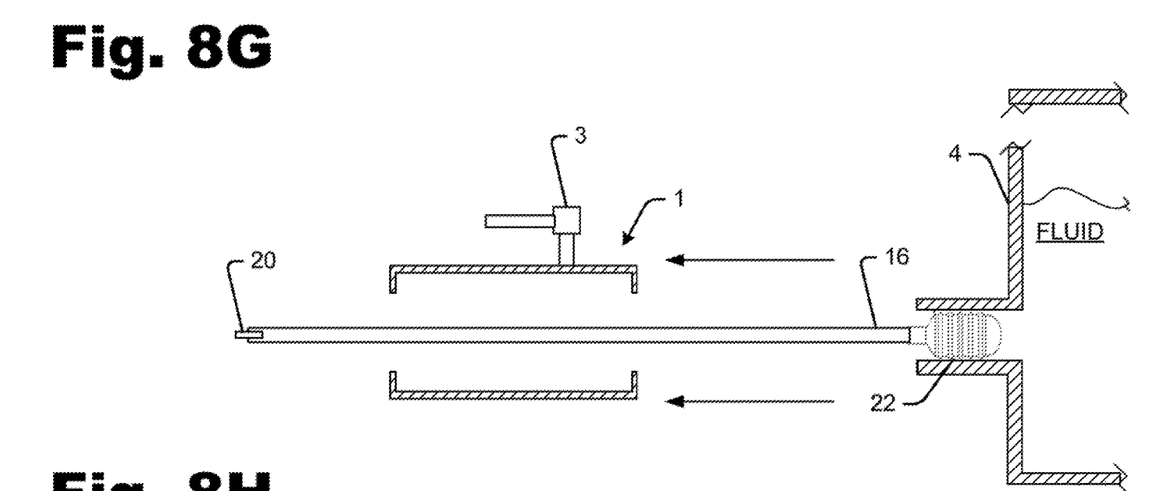

In FIGS. 8F and 8G, the body 12 and the valve 1 are shown being removed from the tank 4. In FIGS. 8F and 8G, the body 12 body is shown removed from the valve 1 first, and then the valve 1 removed from the tank 4. In another example, however, the body 12 and the valve 1 may be removed from the tank 4 as a single unit, and then the body 12 separately removed from the valve 1. The insertion rod 16 and balloon 22 remains in place so that the balloon 22 slows or altogether stops fluid from flowing out of the tank 4.

Figure 8H:
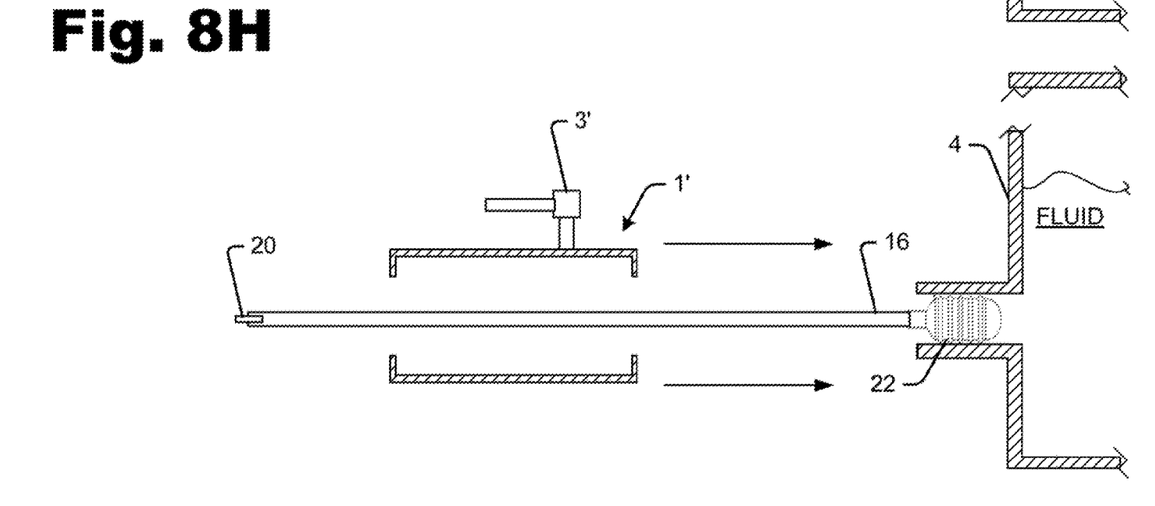
Figure 8I:
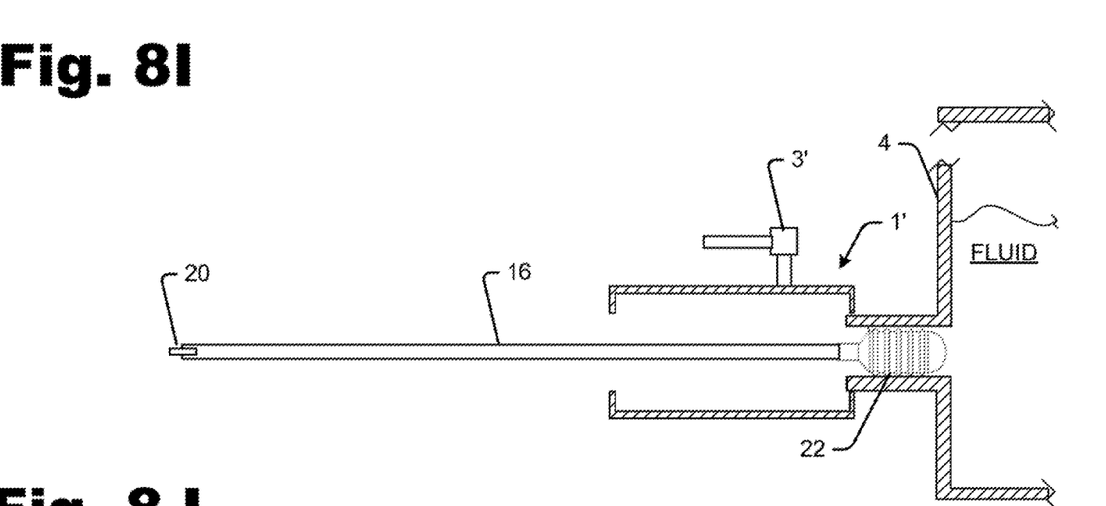
Figure 8J:
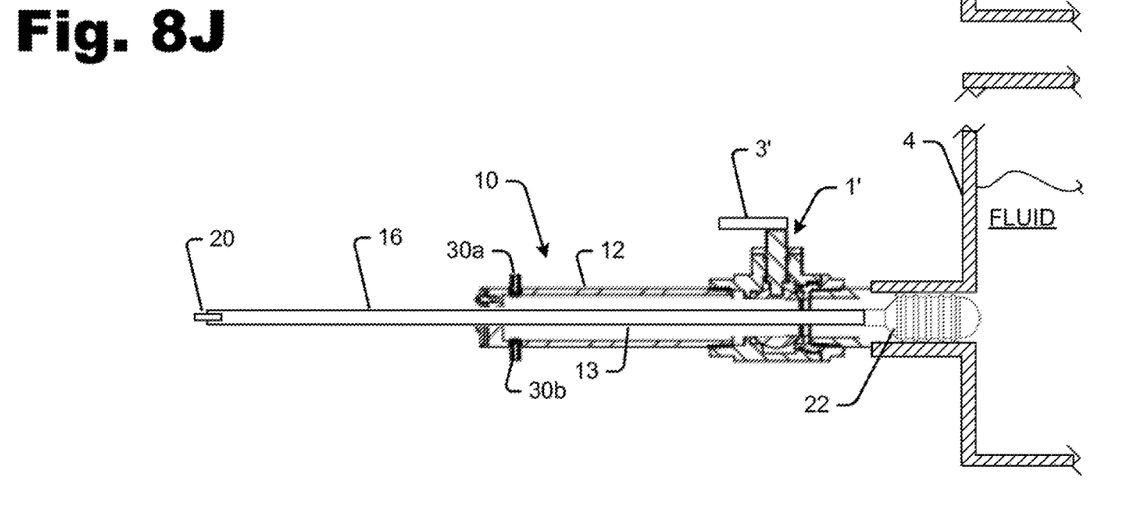

In FIG. 8H, the valve is shown being replaced with another valve 1'. The replacement valve 1' may be valve 1 (e.g., after cleaning, inspection, or repair) reinstalled on the tank 4. Or the replacement valve 1' may be a different valve (e.g., a new valve). The replacement valve 1' is shown installed on the tank 4 in FIG. 8I. In FIG. 8J, the replacement body 12 is shown being installed onto the valve 1'. Again, it is noted that while the replacement valve 1' and replacement body 12 is shown in FIGS. 8H-8J being installed separately, in another example the replacement body 12 and the replacement valve 1' may be connected together and then installed as a single unit onto the tank 4.

Figure 8K:
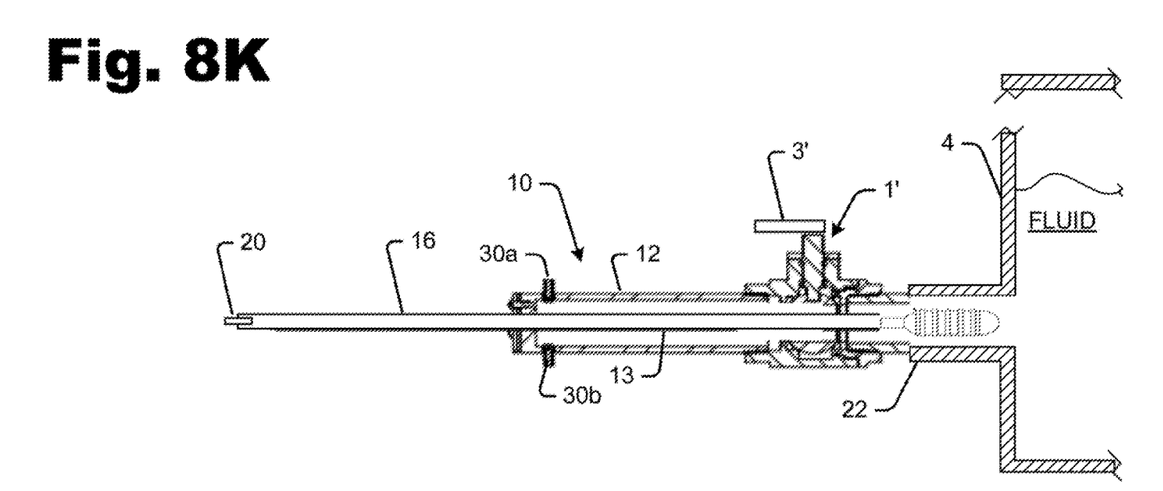

In FIG. 8K, the balloon 22 is shown being deflated. In an example, the balloon is deflated by releasing the Shrader valve in valve stem 20 (e.g., by depressing the valve to release air in the inflation rod 16 and balloon 22).

Figure 8L:
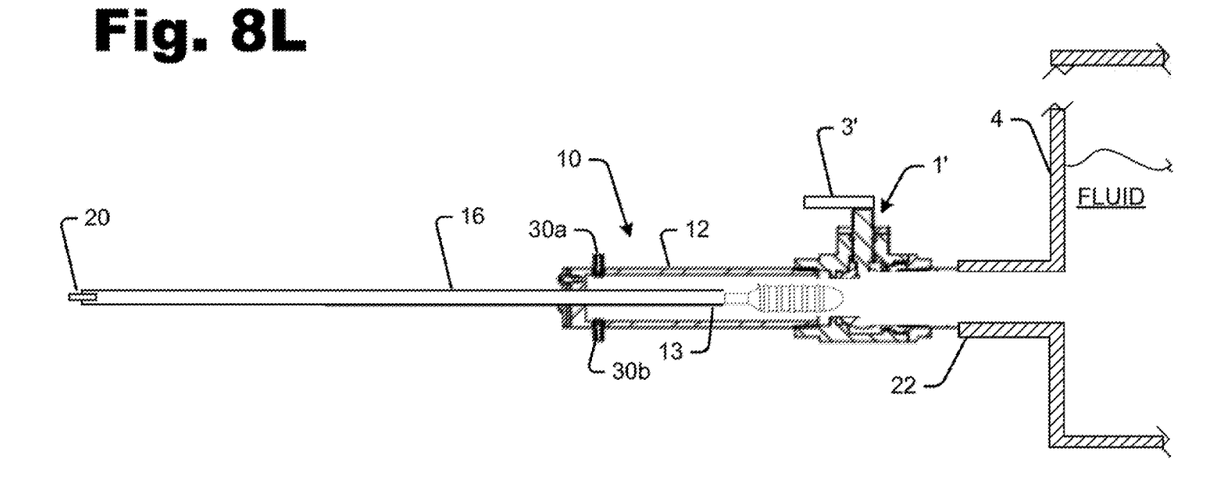
Figure 8M:
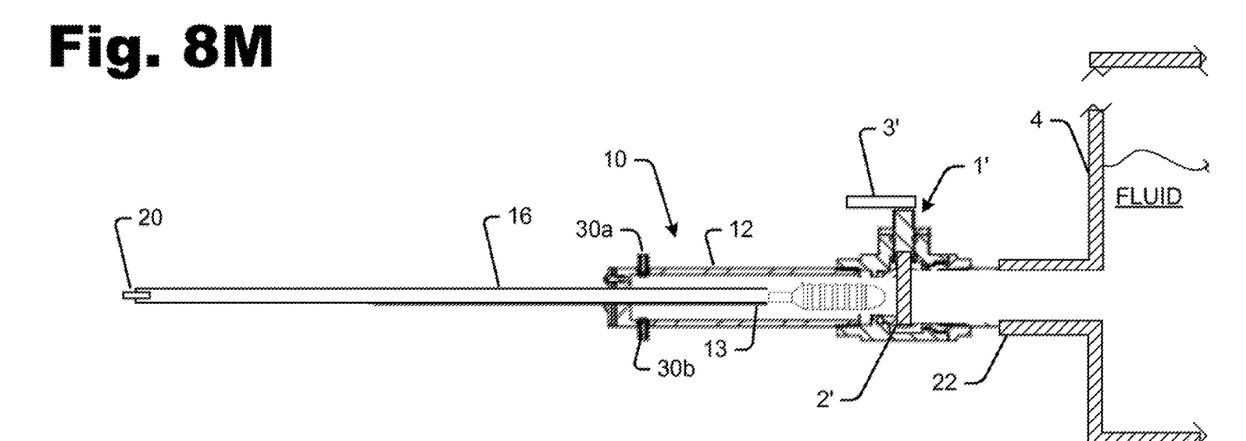
Figure 8N:
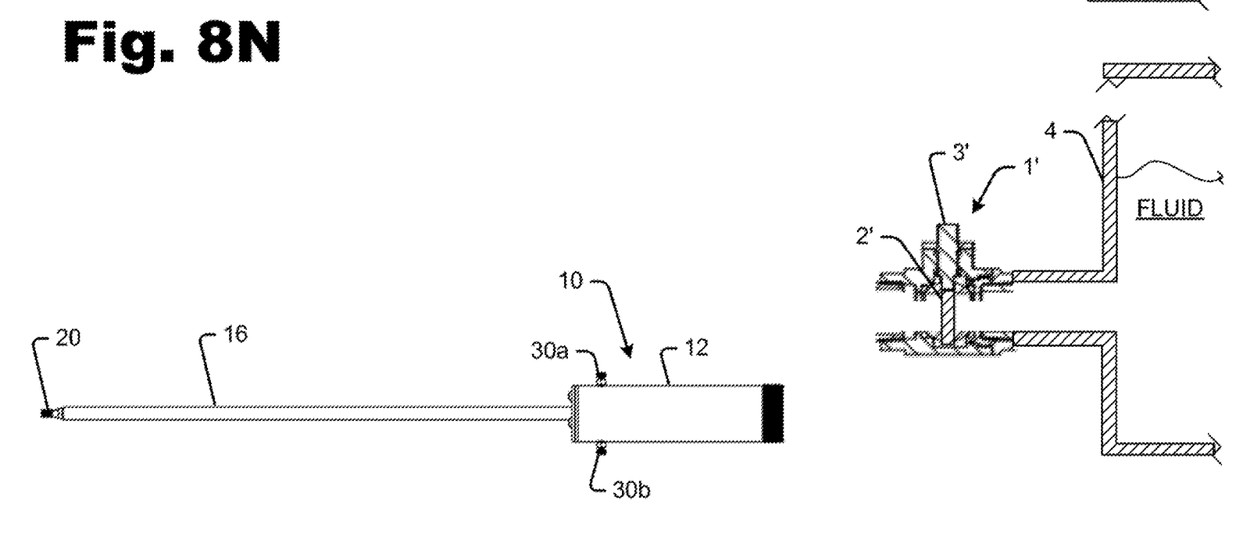

In FIG. 8L, the insertion rod 16 is shown being withdrawn to a position in front of the gate 2' of the valve 1'. The gate 2' of valve 1' is then closed, as shown in FIG. 8M, and the replacement body 12 is detached (e.g., by undoing the thread) from the valve 1'. Accordingly, the valve 1 has been replaced by valve 1', while fluid was contained in the tank 4, without any or without substantial loss of fluid.

The operations shown and described herein are provided to illustrate example implementations. It is noted that the operations are not limited to the ordering shown. Still other operations may also be implemented.

It is noted that the examples shown and described are provided for purposes of illustration and are not intended to be limiting. Still other examples are also contemplated.

The invention claimed is:

1. A method of valve replacement for replacing a valve coupled to a liquid-storage tank, comprising:
    attaching a replacement body to a valve to be replaced, the valve coupled to a liquid-storage tank having a fluid therein, and opening a gate of the valve while the replacement body retains the fluid;

extending an insertion tube through the replacement body and through the valve to a position behind the gate of the valve;

inflating a balloon on the insertion tube in the position behind the gate of the valve such that fluid is prevented from leaking out of the tank;

evacuating fluid from the replacement body by opening a first release valve located in a down position, and facilitating the evacuation of substantially all of the fluid from the replacement body by opening the second release valve;

closing the second release valve and the first release valve;

removing the valve;

replacing the valve by installing the replacement body onto the valve;

deflating the balloon on the insertion tube;

withdrawing the insertion tube and the balloon from behind the gate of the valve; and closing the gate of the valve and removing the replacement body from the valve.

\* \* \* \* \*